(12) United States Patent
Nammi et al.

(10) Patent No.: US 8,094,707 B1
(45) Date of Patent: Jan. 10, 2012

(54) LIST-BASED DETECTION IN FADING CHANNELS WITH LONG INTERSYMBOL INTERFERENCE

(75) Inventors: SaiRamesh Nammi, Richardson, TX (US); Deva K. Borah, Las Cruces, NM (US)

(73) Assignee: Arrowhead Center, Inc., Las Cruces, NM (US)

( * ) Notice: Subject to any disclaimer, the term of this patent is extended or adjusted under 35 U.S.C. 154(b) by 595 days.

(21) Appl. No.: 12/029,922

(22) Filed: Feb. 12, 2008

Related U.S. Application Data

(60) Provisional application No. 60/896,083, filed on Mar. 21, 2007.

(51) Int. Cl.
*H03H 7/30* (2006.01)
(52) U.S. Cl. ........ 375/229; 375/233; 375/234; 381/103; 708/323
(58) Field of Classification Search .................. None
See application file for complete search history.

(56) References Cited

U.S. PATENT DOCUMENTS

| | | | |
|---|---|---|---|
| 5,005,189 A | 4/1991 | Hackett, Jr. | |
| 5,271,042 A | 12/1993 | Borth et al. | |
| 5,774,505 A | 6/1998 | Baugh | |
| 5,892,801 A | 4/1999 | Schneider | |
| 6,134,277 A | 10/2000 | Shah | |
| 6,144,697 A | 11/2000 | Gelfand et al. | |
| 6,161,209 A | 12/2000 | Moher | |
| 6,438,180 B1 | 8/2002 | Kavcic et al. | |
| 6,490,327 B1 | 12/2002 | Shah | |
| 6,539,067 B1 | 3/2003 | Luschi et al. | |
| 6,597,743 B1 | 7/2003 | Khayrallah et al. | |
| 6,658,071 B1 | 12/2003 | Cheng | |
| 6,690,739 B1 | 2/2004 | Mui | |
| 6,691,263 B2 | 2/2004 | Vasic et al. | |
| 6,944,242 B2 | 9/2005 | Yakhnich et al. | |
| 7,088,793 B1 | 8/2006 | Mickelson et al. | |
| 7,292,661 B1 * | 11/2007 | Chan et al. .................. 375/346 |
| 2001/0010089 A1 | 7/2001 | Gueguen | |
| 2002/0122510 A1 * | 9/2002 | Yakhnich et al. ............. 375/342 |
| 2002/0141486 A1 | 10/2002 | Bottomley et al. | |
| 2002/0146070 A1 | 10/2002 | Lee | |
| 2005/0186933 A1 | 8/2005 | Trans | |
| 2006/0115029 A1 | 6/2006 | Marrow | |
| 2006/0274861 A1 | 12/2006 | Langenbach et al. | |
| 2006/0285852 A1 | 12/2006 | Xi et al. | |

OTHER PUBLICATIONS

Chase, A Class of Algorithms for Decoding Block Codes With Channel Measurement Information; Jan. 1972; IEEE Transactions on Information Theory; vol. IT-18, No. 1; pp. 170-182.*

Al-Dahir, Naofal et al., "Efficiently Computed Reduced-Parameter Input-Aided MMSE Equalizers for ML Detection: A Unified Approach", *IEEE Transactions on Information Theory* vol. 42, No. 3 May 1996, 903-915.

(Continued)

*Primary Examiner* — David C. Payne
*Assistant Examiner* — Adolf Dsouza
(74) *Attorney, Agent, or Firm* — Jeffrey D. Myers; Peacock Myers, P.C.

(57) ABSTRACT

An apparatus, computer software, and method for data detection in channels suffering from intersymbol interference comprising receiving a signal representative of a binary digit of data, computing a reliability score for that binary digit of data via windowed Chase equalization, and based on the reliability score, causing a signal to be output that the binary digit is a zero or a one.

12 Claims, 10 Drawing Sheets

OTHER PUBLICATIONS

Borah, Deva K. et al., "Receiver Structures for Time-Varying Frequency-Selective Fading Channels", *IEEE Journal on Selected Areas in Communications* vol. 17, No. 11 Nov. 1999, 1863-1875.

Chase, David, "A Class of Algorithms for Decoding Block Codes with Channel Measurement Information", *IEEE Transactions on Information Theory* vol. IT-18, No. 1 Jan. 1972, 170-182.

Duel-Hallen, Alexandra et al., "Delayed Decision-Feedback Sequence Estimation", *IEEE Transactions on Communications* vol. 37, No. 5 May 1989, 428-436.

Eyuboglu, M. V. et al., "Reduced-State Sequence Estimation with Set Partitioning and Decision Feedback", *IEEE Transactions on Communications* vol. 36, No. 1 Jan. 1988, 13-20.

Falconer, D. D. et al., "Adaptive Channel Memory Truncation for Maximum Likelihood Sequence Estimation", *The Bell System Technical Journal* vol. 52, No. 9, American Telephone and Telegraph Company Nov. 1973, 1541-1562.

Fincke, U. et al., "Improved Methods for Calculating Vectors of Short Length in a Lattice, Including a Complexity Analysis", *Mathematics of Computation* vol. 44, No. 170, American Mathematical Society Apr. 1985, 463-471.

Forney, Jr., G. D., "Lower Bounds on Error Probability in the Presence of Large Intersymbol Interference", *IEEE Transactions on Communications* vol. 20 Feb. 1972, 76-77.

Forney, Jr., G. D., "Maximum-Likelihood Sequence Estimation of Digital Sequences in the Presence of Intersymbol Interference", *IEEE Transactions on Information Theory* vol. IT-18, No. 3 May 1972, 363-378.

Gu, D. et al., "Performance analysis of transmit diversity scheme with imperfect channel estimation", *Electronics Letters* vol. 39, No. 4 Feb. 2003, 402-403.

Hashimoto, Takeshi, "A List-Type Reduced-Constraint Generalization of the Viterbi Algorithm", *IEEE Transactions on Information Theory* vol. IT-33, No. 6 Nov. 1987, 866-876.

Jalden, Joakim et al., "On the Complexity of Sphere Decoding in Digital Communications", *IEEE Transactions on Signal Processing* vol. 53, No. 4 Apr. 2005, 1474-1484.

Kannan, R., "Improved algorithms for integer programming and related lattice problems", *Proc. ACM Symp. Theory of Comput.* Association for Computing Machinery, New York 1983, 193-206.

Kay, S. M., "Least Squares", *Fundamentals of Statistical Signal Processing Estimation Theory* Prentice Hall Signal Processing Series 2000, 219-221.

Kuhn, C. et al., "8-PSK turbo equalization with the list-sequential (LISS) algorithm", *IEEE ISIT 2004* Chicago 2004, 555.

Lee, Won U. et al., "A Maximum-Likelihood Sequence Estimator with Decision-Feedback Equalization", *IEEE Transactions on Communications* vol. 25, No. 9 Sep. 1977, 971-979.

Ling, Fuyun, "Matched Filter-Bound for Time-Discrete Multipath Rayleigh Fading Channels", *IEEE Transactions on Communications* vol. 43, No. 2/3/402/03/04/1995, 71-713.

Luo, Jie, "Fast Maximum Likelihood Sequence Detection Over Vector Intersymbol Interference Channels", *Proc. IEEE ICASSP 2007* Honolulu 2007.

Maddock, Robert D. et al., "Reliability-Based Coded Modulations with Low-Density Parity-Check Codes", *IEEE Transactions on Communications* vol. 54, No. 3 Mar. 2006, 403-406.

Mazo, J. E., "Exact Matched Filter Bound for Two-Beam Rayleigh Fading", *IEEE Transactions on Communications* vol. 39, No. 7 Jul. 1991, 1027-1030.

Narayanan, Krishna R. et al:, "Estimating the PDF of the SIC-MMSE Equalizer Output and Its Applications in Designing LDPC Codes with Turbo Equalization", *IEEE Transactions on Wireless Communications* vol. 4, No. 1 Jan. 2005, 278-287.

Ohno, Shuichi et al., "ML Sequence Estimation for Long ISI Channels with Controllable Complexity", *2004 IEEE International Conference on Communications* Jun. 2004, 2782-2786.

Poor, H. V. et al., "Probability of Error in MMSE Multiuser Detection", *IEEE Transactions on Information Theory* vol. 43, No. 1 May 1997, 858-871.

Proakis, J. G. et al., "Communication Through Band-Limited Linear Filter Channels", *Digital Communications* 4th edition, McGraw-Hill, New York 2000, 598-599, 616, 642-643.

Pyndiah, Ramesh M., "Near-Optimum Decoding of Product Codes: Block Turbo Codes", *IEEE Transactions on Communications* vol. 46, No. 8 Aug. 1998, 1003-1010.

Qin, Zhiliang et al., "Iterative Reduced-Complexity Multiuser Detection Based on Chase Decoding for Synchronous Turbo-Coded CDMA System", *IEEE Journal on Selected Areas in Communications* vol. 24, No. 1 Jan. 2006, 200-208.

Sadjadpour, Hamid R. et al., "Pseudo-Maximum-Likelihood Data Estimation Algorithm and Its Application over Band-Limited Channels", *IEEE Transactions on Communications* vol. 49, No. 1 Jan. 2001, 120-129.

Sheen, Wern-Ho et al., "MLSE Equalization and Decoding for Multipath-Fading Channels", *IEEE Transactions on Communications* vol. 39, No. 10 Oct. 1991, 1455-1464.

Simon, M. K. et al., "Useful Expressions for Evaluating Average Error Probability Performance", *Digital Communications over fading channels* John Wiley & Sons, Inc. 2000, 123-167.

Stuber, GL. L., "Sequence Estimation: MLSE and the Viterbi Algorithm", *Principles of Mobile Communication* Kluwer Academic Publishers 1996, 331-333.

Verdu, Sergio, "Maximum Likelihood Sequence Detection for Intersymbol Interference Channels: A New Upper Bound on Error Probability", *IEEE Transactions on Information Theory* vol. IT-33, No. 1 Jan. 1987, 62-68.

Vermuelen, F. L. et al., "Reduced-state Viterbi decoders for channels with intersymbol interference", *Proc. IEEE ICC 1974* Minneapolis 1974.

Vikalo, H. et al., "Sphere-Constrained ML Detection for Frequency-Selective Channels", *IEEE Transactions on Communication* vol. 54, No. 7 Jul. 2006, 1179-1183.

Viterbo, Emanuele et al., "A Universal Lattice Code Decoder for Fading Channels", *IEEE Transactions on Information Theory* vol. 45, No. 5 Jul. 1999, 1639-1642.

Waters, Deric W. et al., "The Chase Family of Detection Algorithms for Multiple-Input Multiple-Output Channels", *Proc. IEEE GLOBECOM* Dallas 2004.

Wu, Xianren et al., "A New Adaptive Two-Stage Maximum-Likelihood Decoding Algorithm for Linear Block Codes", *IEEE Transactions on Communications* vol. 53, No. 6 Jun. 2005, 909-913.

Xiaofu, Wu et al., "Low complexity multisymbol differential detection of MDPSK over flat correlated Rayleigh fading channels", *Electronics Letters* vol. 34, No. 21 Oct. 1998, 2008-2009.

\* cited by examiner

LIST-BASED DETECTION IN FADING CHANNELS WITH LONG INTERSYMBOL INTERFERENCE

CROSS-REFERENCE TO RELATED APPLICATIONS

This application claims priority to and the benefit of the filing of U.S. Provisional Patent Application Ser. No. 60/896,083, entitled "List-Based Detection in Fading Channels with Long Intersymbol Interference", filed on Mar. 21, 2007, and the specification and claims thereof are incorporated herein by reference.

STATEMENT REGARDING FEDERALLY SPONSORED RESEARCH OR DEVELOPMENT

Not Applicable.

INCORPORATION BY REFERENCE OF MATERIAL SUBMITTED ON A COMPACT DISC

Not Applicable.

COPYRIGHTED MATERIAL

Not Applicable.

BACKGROUND OF THE INVENTION

1. Field of the Invention (Technical Field)

The present invention relates to methods, software, and apparatuses for improving data channels suffering from intersymbol interference (ISI).

2. Description of Related Art

Note that the following discussion refers to a number of publications by author(s) and year of publication, and that due to recent publication dates certain publications are not to be considered as prior art vis-à-vis the present invention. Discussion of such publications herein is given for more complete background and is not to be construed as an admission that such publications are prior art for patentability determination purposes.

It is well known that maximum likelihood sequence detection (MLSD) is an optimal equalization technique for intersymbol interference (ISI) channels in the sense that it minimizes the sequence error probability for equally likely input data sequences. G. D. Forney, Jr., "Maximum-likelihood sequence estimation of digital sequences in the presence of intersymbol interference," IEEE Trans. Inform. Theory, vol. 18, pp. 363-378, May 1972. However, the number of states in the Viterbi algorithm (VA) while implementing MLSD grows exponentially with ISI length and the number of bits per constellation point. Other equalization techniques such as linear and decision feedback equalizers have also been thoroughly investigated in the literature. Although they provide low complexity approaches, their bit error rate (BER) performance may significantly fall short of MLSD's performance. J. G. Proakis, Digital Communications, 4th ed. New York: McGraw-Hill, 2000.

In order to design reduced complexity MLSD for long ISI channels, many researchers have focused on channel shortening before using MLSD. For this purpose, both linear and decision feedback equalizers have been used to reduce ISI length before applying the MLSD algorithm. D. D. Falconer and F. R. Magee Jr., "Adaptive channel memory truncation for maximum likelihood sequence estimation" Bell Syst. Tech. J., vol. 52, pp. 1541-1562, November 1973; W. U. Lee and F. S. Hill, "A maximum-likelihood sequence estimator with decision-feedback equalizer," IEEE Trans. Commun., vol. 25, pp. 971-979, September 1977; and N. Al-Dhahir and J. M. Cioffi, "Efficiently computed reduced-parameter input-aided MMSE equalizers for ML detection: A unified approach," IEEE Trans. Inform. Theory, vol. 42, pp. 903-915, May 1996. However, perfect channel shortening is difficult and the BER performance degrades due to residual filter errors. Other complexity reduction approaches include a reduction in the number of surviving paths in VA, F. L. Vermeulen and M. E. Hellman, "Reduced-state Viterbi decoders for channels with intersymbol interference," Proc. IEEE ICC '1974, Minneapolis, 1974, reduced state sequence estimators for large signal constellation sizes, M. V. Eyuboglu, and S. U. Qureshi, "Reduced-state sequence estimation with set partitioning and decision feedback," IEEE Trans. Commun., vol. 36, pp. 13-20, January 1988, and delayed decision feedback sequence estimators for long ISI channels, A. Duel-Hallen, and C. Heegard, "Delayed decision-feedback sequence estimation," IEEE Trans. Commun., vol. 37, pp. 428-436, May 1989. However, none of the above sub-optimum techniques achieves close to MLSD performance without a significant increase in implementation complexity. Hence, for long ISI channels and large symbol alphabets, complexity and BER performance have been a matter of trade-off.

Recently, the inventors in H. Vikalo, B. Hassibi, and U. Mitra, "Sphere-constrained ML detection for frequency-selective channels," IEEE Trans. Commun., vol. 54, pp. 1179-1183, July 2006, extended the sphere decoder (SD) algorithm of U. Fincke and M. Pohst, "Improved methods for calculating vectors of short length in a lattice, including a complexity analysis," Math Comput., vol. 44, pp. 463-471, April 1985; R. Kannan, "Improved algorithms for integer programming and related lattice problems," Proc. ACM Symp. Theory of Comput. ', 1983; and E. Viterbo and J. Boutros, "A universal lattice code decoder for fading channels," IEEE Trans. Inform. Theory, vol. 45, pp. 1639-1642, July 1999, for frequency selective channels. The resulting algorithm is a hybrid of VA and SD. From the results on SD described in J. Jalden and B. Ottersten, "On the complexity of sphere decoding in digital communications," IEEE Trans. Signal Processing, vol. 53, pp. 1474-1484, April 2005, it can be seen that the complexity of this algorithm is exponential in block length, and so this algorithm is suitable only for short data lengths. In S. Ohno and G. B. Giannakis, "ML sequence estimation for long ISI channels with controllable complexity," Proc. IEEE ICC '2004, Paris, 2004, a method called distributed zero padding (D-ZP) is shown to achieve a BER performance comparable to maximum likelihood (ML) detection for binary signaling. However, regular insertion of zeros during transmission compromises its effective data rate. A fast MLSD method that provides significantly low complexity at high signal-to-noise ratio (SNR) over vector ISI channels has also been recently described in J. Luo, "Fast maximum likelihood sequence detection over vector intersymbol interference channels," Proc. IEEE ICASSP '2007, Honolulu, 2007.

Existing methods of dealing with ISI do not offer near-optimal performance without significant complexity. The present invention, a list based data detection method, apparatus, and software for long intersymbol interference channels, is able to guarantee a specified level of near-optimal performance with low complexity. The invention first extracts bit reliabilities using a low complexity equalizer and then uses these reliabilities to generate lists of possible data vectors before making final bit decisions. The invention can ensure a specific bit error rate performance with respect to a maximum likelihood sequence detector.

List based techniques have also been considered by other researchers in various contexts. For example, a list-type generalization of the VA is proposed in T. Hashimoto, "A list-type reduced-constraint generalization of the Viterbi algorithm," *IEEE Trans. Inform. Theory*, vol. 33, pp. 866-876, November 1987, where a number of survivors is selected from lists of candidates at each decoding step of the VA. In C. Kuhn and J. Hagenauer, "8-PSK turbo equalization with the list-sequential (LISS) algorithm," *Proc. IEEE ISIT'2004*, Chicago, 2004, a list-sequential equalizer, based on a modified stack algorithm, is discussed. This algorithm operates in the turbo equalization framework, and uses the information fed back from the channel decoder. However, the present invention focuses on an equalization algorithm without involving any channel decoder, and includes the following additional contributions. The invention uses a Chase-type algorithm, D. Chase, "A class of algorithms for decoding block codes with channel measurement information," *IEEE Trans. Inform. Theory*, vol. 18, pp. 170-182, January 1972, for equalization of ISI channels. In earlier work, the Chase algorithm has been used to explore the soft decision decoding of block and turbo product codes. R. M. Pyndiah, "Near-optimum decoding of product codes: block turbo codes," *IEEE Trans. Commun.*, vol. 46, pp. 1003-1010, August 1998; and X. Wu, H. R. Sadjadpour, and Z. Tian, "A new adaptive two-stage maximum-likelihood decoding algorithm for linear block codes," *IEEE Trans. Commun.*, vol. 53, pp. 909-913, June 2005. It has also been used for multisymbol differential detection, W. Xiaofu and S. Songgeng, "Low complexity multisymbol differential detection of MDPSK over flat correlated Rayleigh fading channels," *IEE Electronics Lett.*, vol. 34, pp. 2008-2009, October 1998, detection over multiple input multiple output channels, D. Waters and J. R. Barry, "The Chase family of detection algorithms for multiple-input multiple-output channels," *Proc. IEEE GLOBECOM'2004*, Dallas, 2004, and for multiuser detection in spread spectrum systems, Z. Qin and K. C. Teh, "Iterative reduced-complexity multiuser detection based on Chase decoding for synchronous turbo-coded CDMA system," *IEEE J. Select. Areas Commun.*, vol. 24, pp. 200-208, January 2006. A direct application of the Chase algorithm, however, generates many test patterns, thereby increasing the complexity significantly. The invention uses the Chase method with a windowed technique resulting in significantly lower complexity. The invention also employs a threshold based list generation approach for implementing Chase. Finally, near-ML performance is obtained with significantly low complexity.

BRIEF SUMMARY OF THE INVENTION

The present invention is of an apparatus, computer software, and method for data detection in channels suffering from intersymbol interference, comprising: receiving a signal representative of a binary digit of data; computing a reliability score for that binary digit of data via windowed Chase equalization; and based on the reliability score, causing a signal to be output that the binary digit is a zero or a one. In the preferred embodiment, computing comprises employing a linear minimum mean squared error as a first stage of the windowed Chase equalization, more preferably also employing a windowed Chase algorithm as a second stage of the windowed Chase equalization, and most preferably wherein the first stage does not have to complete before initiation of the second stage. A decision feedback equalizer is employed as a first stage of the windowed Chase equalization, more preferably also employing a windowed Chase algorithm as a second stage of the windowed Chase equalization, and most preferably wherein the first stage does not have to complete before initiation of the second stage.

Objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE SEVERAL VIEWS OF THE DRAWINGS

The accompanying drawings, which are incorporated into and form a part of the specification, illustrate one or more embodiments of the present invention and, together with the description, serve to explain the principles of the invention. The drawings are only for the purpose of illustrating one or more preferred embodiments of the invention and are not to be construed as limiting the invention. In the drawings.

DETAILED DESCRIPTION OF THE INVENTION

Figure 1:
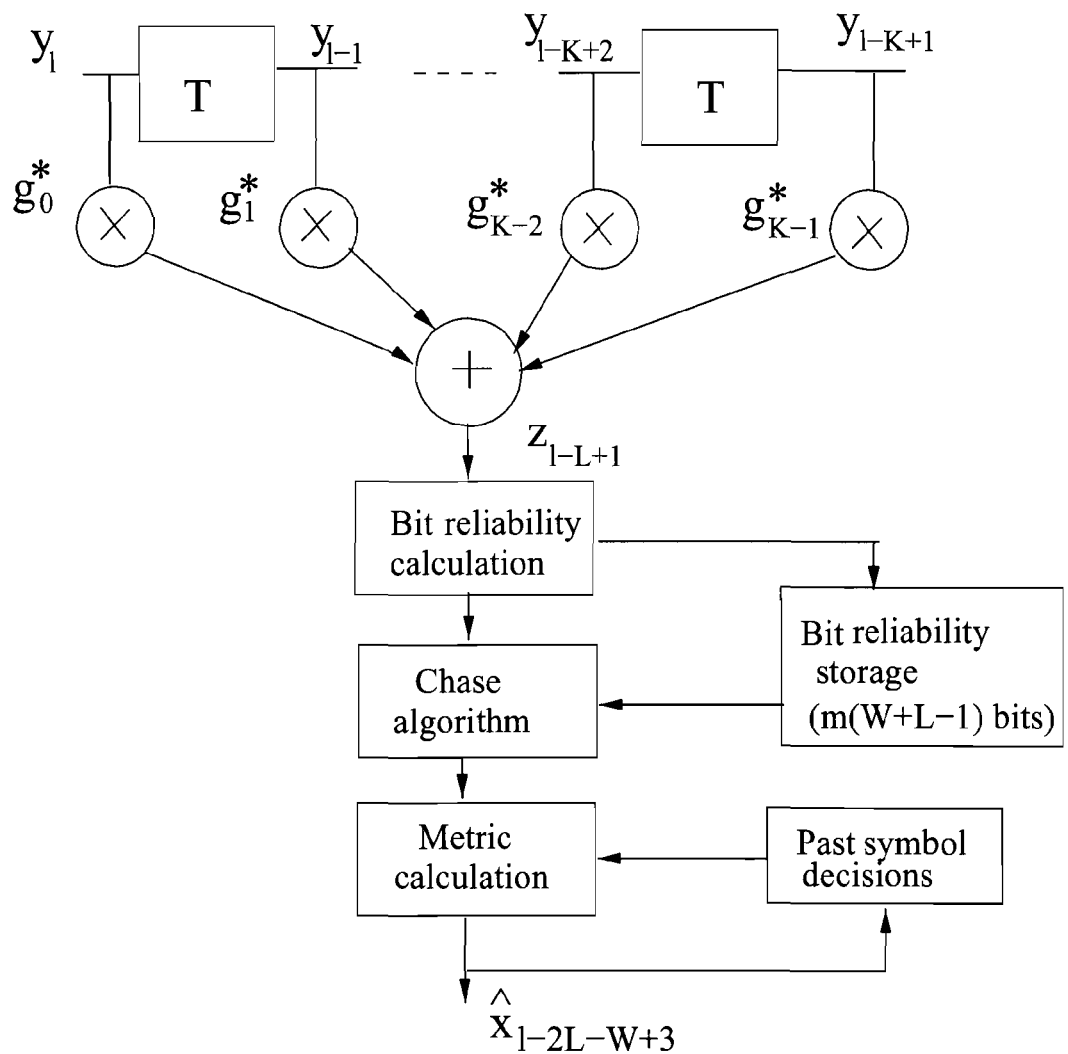
FIG. 1 is a block diagram of the windowed Chase equalizer (WCE) apparatus, software, and method of the present invention.

The present invention is of a method (and concomitant software and apparatus) for obtaining near-optimal data detection performance in channels with long ISI. By combining a low complexity equalizer with a windowed list search, near-optimal performance is obtained with much lower complexity and delay than with a conventional Viterbi algorithm.

The present application will use the following notation standards in the specification and claims: Bold upper case (lower case) letters denote matrices (vectors). The notations $(\cdot)^T$, $(\cdot)^H$, $(\cdot)^*$, $E[\cdot]$, $P[\cdot]$, $\text{Re}\{\cdot\}$ and $\text{Im}\{\cdot\}$ denote transpose, Hermitian, conjugation, expectation, probability, real and imaginary parts respectively. $A^c$ is the complement of A, $\|\cdot\|$ is the Euclidean norm, and $$\binom{m}{k}$$

denotes m!/[(m−k)!k!].

A discrete-time complex baseband system is considered. The k-th received sample $y_k$ is given by $$y_k = \sum_{i=0}^{L-1} h_i x_{k-i} + n_k \quad (1)$$

where L is the ISI length, $h_i$ is the i-th channel coefficient, and $n_k$ denotes complex additive white Gaussian noise (AWGN) with zero mean and variance $\sigma^2$. The i-th complex M-ary symbol $x_i$ is obtained from a symbol mapper as $x_i = F(d_i)$, where $d_i = [d_{im}, d_{im+1}, \ldots, d_{(i+1)m-1}]^T$ denotes a group of information bits, and $m = \log_2 M$ is the number of bits per constellation point. Consider both fixed ISI channel and randomly varying complex Gaussian ISI channels where the coefficients change from one data packet to the next.

Considering a received signal vector of length N samples, one can rewrite (1) in vector form as $$y_k = X_k h + n_k \quad (2)$$

where $y_k = [y_k, \ldots, y_{k-N+1}]^T$, $n_k = [n_k, \ldots, n_{k-N+1}]^T$, $h = [h_0, \ldots, h_{L-1}]^T$, and $X_k$ is an N×L data matrix whose i-th row is given by $[x_{k-i}, x_{k-i-1}, \ldots, x_{k-i-L+1}]$ for $0 \leq i \leq N-1$. If $N_p$ denotes the total number of transmitted symbols in a data packet then setting $k = N_p + L - 2$ and $N = N_p + L - 1$ makes the vector $y_k$ cover the entire data packet.

It is well known that MLSD minimizes the metric $\|y_{N_p+L-2} - X_{N_p+L-2} h\|^2$ and results in a tree search with $M^{N_p}$ paths. An efficient approach is to use VA with $M^{L-1}$ states, which is too complex for long ISI channels and large symbol alphabets.

Next is described the windowed Chase equalization (WCE) that will eventually lead to the strategy of the invention to ensure a specified BER performance with respect to MLSD. The WCE belongs to the tree search (rather than the trellis search) category of MLSD with three modifications. First, many of the less likely paths in tree search are eliminated by using a sub-optimum low complexity equalizer. Second, the exponential complexity increase in data length is overcome by using a windowed search instead of a one-shot full search over the entire data length. This approach has been exploited in the Pseudo-ML algorithm presented in H. R. Sadjadpour and C. L. Weber, "Pseudo-maximum-likelihood data estimation algorithm and its application over band-limited channels," IEEE Trans. Commun., vol. 49, pp. 120-129, January 2001. Finally, the search is at the bit level rather than at the symbol level.

The proposed WCE is a two stage algorithm consisting of a linear minimum mean squared error (MMSE) equalizer as the first stage followed by the Chase algorithm. Other equalizers, such as the decision feedback equalizer (DFE), can also be used as the first stage. The second stage does not have to wait for completion of the first stage. At time l, the inputs to the MMSE equalizer is the vector $y_l = [y_l, \ldots, y_{l-K+1}]^T$, where K is the MMSE filter length. This is shown in FIG. 1, which can be implemented in hardware (e.g., application specific integrated circuit, digital signal processor, field programmable gate array, or like hardware) or computer-readable software (including firmware) embodied on a physical medium and operating on hardware. Denoting the MMSE filter coefficient vector as $g = [g_0, \ldots, g_{K-1}]^T$, the optimal filter coefficient vector is given by $g = R^{-1} p$, where $R = E[y_l y_l^H]$, and $p = E[x_{l-L+1}^* y_l]$. The MMSE output at time l is $z_{l-L+1} = g^H y_l$, which is used to obtain reliability of the m bits $d_{(l-L+1)m}, \ldots, d_{(l-L+2)m-1}$ corresponding to symbol $x_{l-L+1}$. So, at time l, reliabilities of all bits up to $d_{(l-L+2)m-1}$ are available. The reliability of a bit $d_i$ is measured by the log-likelihood ratio, $\log(P(d_i=1|z(l-L+1))/P(d_i=0|z(l-L+1)))$, $(l-L+1)m \leq i \leq (l-L+2)m-1$. In the present case case, it is represented by the location of $z_{l-L+1}$ on the complex signal space with respect to the decision line for the bit. For binary phase-shift keying (BPSK) in AWGN, $\text{Re}\{z_{l-L+1}\}$ gives the reliability and the imaginary line becomes the decision line. For quadrature phase-shift keying (QPSK) with constellation points $(1+j)/\sqrt{2}, (-1+j)/\sqrt{2}, (-1-j)/\sqrt{2}, (1-j)/\sqrt{2}$ representing bit pairs (0,0), (0,1), (1,1), and (1,0) respectively, $\text{Im}\{z_{l-L+1}\}$ and $\text{Re}\{z_{l-L+1}\}$ give the reliabilities of the first and the second bit respectively. For other signal constellations, the bit reliability expression can take different forms. R. D. Maddock and A. H. Banihashemi, "Reliability-based coded modulation with low-density parity-check codes," IEEE Trans. Commun., vol. 54, pp. 403-406, March 2006. By using bit reliabilities, i.e., by using soft information from the MMSE filter output, the invention is able to improve the detector's performance significantly.

Once the reliabilities of all bits up to $d_{(l-L+2)m-1}$ are available, the second stage, i.e., the Chase algorithm begins. At time l, a time window of length mW bits is considered over bits $d_{(l-2L+3)m-1}, \ldots, d_{(l-2L-W+3)m}$. Let $\Gamma$ be the set of all bits in the window whose reliability magnitudes are below a certain threshold $V_{th}$ and let $\gamma$ be the cardinality of $\Gamma$. The choice of $V_{th}$ will be discussed next. If any of the bits forming symbol $x_{l-2L-W+3}$ is in $\Gamma$, then the Chase algorithm generates a list of $2^\gamma$ candidate test vectors, where the k-th candidate vector is a hypothetical sequence of mW bits $\hat{d}^{(k)} = [\hat{d}_{(l-2L+3)m-1}^{(k)}, \ldots, \hat{d}_{(l-2L-W+3)m}^{(k)}]^T$. The first candidate vector is obtained by taking hard decisions of reliability values of mW bits. The subsequent hypothetical sequences (candidates in the list) are obtained by varying the bits in $\Gamma$, while keeping the other bits same as in the first candidate vector. Note that if none of the bits in $x_{l-2L-W+3}$ is in $\Gamma$ then the list is restricted to only the first candidate vector. Let S denote the list size. When $\gamma$ is large, a performance complexity tradeoff can be obtained by considering the most important error patterns in the Chase algorithm so that $S < 2^\gamma$. For each test vector $\hat{d}^{(k)}$, the hypothetical symbol vector $\hat{x}^{(k)} = [\hat{x}_{l-2L+2}^{(k)}, \ldots, \hat{x}_{l-2L-W+3}^{(k)}]^T$ is created using the symbol mapper. Then a final decision on the $(l-2L-W+3)$-th symbol is $\hat{x}_{l-2L-W+3} = \hat{x}_{l-2L-W+3}^{(\eta)}$, where $$\eta = \arg\max_k p(y_l | \hat{x}_{l-L+1}, \ldots, \hat{x}_{l-2L+3}, \hat{x}^{(k)}, \hat{x}_{l-2L-w+2}, \ldots, \hat{x}_{l-3L-W+4}), \quad (3)$$

$y_l$ is a vector of length N=W+L−1 and p(·) denotes probability density function (pdf). The symbols $\hat{x}_{l-L+1}, \ldots, \hat{x}_{l-2L+3}$ are obtained by taking hard decisions of the reliability values of the MMSE filter output. The symbols $\hat{x}_{l-2L-W+2}, \ldots, \hat{x}_{l-3L-W+4}$ are already detected symbols. It is clear that, due to AWGN, the above pdf maximization becomes minimization of $\|y_l - \hat{X}_l^{(k)} h\|^2$ over all S hypotheses, where $\hat{X}_l^{(k)}$ is a matrix as defined in (2) with elements $\hat{x}_{l-L+1}, \ldots, \hat{x}_{l-2L+3}, \hat{x}_{l-2L+2}^{(k)}, \ldots, \hat{x}_{l-2L-W+3}^{(k)}, \hat{x}_{l-2L-W+2}, \ldots, \hat{x}_{l-3L-W+4}$. Thus a decision delay of (W+2L−3) symbols occurs. In our numerical study, W=L is used resulting in a decision delay of 3L−3 symbols. Note that in VA, a typical decision delay of about 4L to 5L is used based on experience. G. L. Stuber, Principles of Mobile Communication, Kluwer Academic Publishers, 1996.

Next consider BPSK or QPSK modulation. The probability of an error e in bit $d_i$ can be written as $$P_b = \sum_{k=0}^{1} P(e|d_i=k)P(d_i=k) \quad (4)$$

Assuming bits 0 and 1 to be equally likely and $P(e|d_i=K)$ to be same for $k=0$ and 1, we can write $P_b=P(e|d_i=0)$. Let V be the random variable denoting the reliability of bit $d_i$ at the output of the MMSE filter. Let $E[V|d_i=0]=\mu_0$ and $E[V|d_i=1]=\mu_1$. Without loss in generality, assume $\mu_1 > \mu_0$. Let us define $\mu=(\mu_0+\mu_1)/2$, so $\mu$ forms the decision boundary and $\mu_0=-\mu_1$, which implies $\mu=0$. Then $P_b$ can be written as $$P_b = P(e|d_i=0, V \geq V_{th})P(V \geq V_{th}|d_i=0)$$

$$+ P(e|d_i=0, V < V_{th})P(V < V_{th}|d_i=0) \quad (5)$$

Denote $P(V \geq V_{th}|d_i=0)$ as $P_\delta$. If $V \geq V_{th}$ the algorithm makes a hard decision on the reliability value and this decision is final. Therefore, $P(e|d_i=0, V \geq V_{th})=1$, which implies that the first term on the right hand side of (5) is $$P_\delta = \int_{V_{th}}^{\infty} p(v|d_i=0)dv.$$

Approximate $p(v|d_i=0)$ to be Gaussian, H. V. Poor and S. Verdu, "Probability of error in MMSE multiuser detection," *IEEE Trans. Inform. Theory*, vol. 43, pp. 858-871, May 1997; and K. R. Narayanan, X. Wang and G. Yue "Estimating the PDF of the SIC-MMSE equalizer output and its applications in designing LDPC codes with turbo equalization," *IEEE Trans. Wireless Commun.*, vol. 4, pp. 278-287, January 2005, with variance $\sigma_0^2$. One then obtains $$P_\delta = Q\left(\frac{V_{th} + |\mu_0|}{\sigma_0}\right),$$

where $Q(\cdot)$ is the Gaussian tail probability. Evaluation of the second term of (5) is difficult. However, one is mostly interested near the ML region. Hence one preferably proceeds as follows.

For a large window size, if a tree search is performed over all possible bit sequences for bits in $\Gamma$ and $\Gamma^c$, then ML BER performance, $P_{ML}$, i.e., $P(e|d_i=0) \Box P_{ML}$, is obtained. This is also true for asymptotically large $V_{th}$, i.e., when $V_{th} \to \infty$, one can write $$P(e|d_i=0, V < V_{th}) \Box P_{ML} \quad (6)$$

Even for moderate $V_{th}$ so that $P_\delta \leq P_{ML}$, the probability that an erroneous bit is picked for $\Gamma^c$ is less than $P_{ML}$. Thus although an exhaustive search over all bits in $\Gamma$ and $\Gamma^c$ is not done, the use of good quality fixed bits in $\Gamma^c$ during search over bits in $\Gamma$ makes (6) a good approximation. One can thus write from (5)

$$P_b \approx P_\delta + (1-P_\delta)P_{ML} \quad (7)$$

Note that when $V_{th}$ is large, the algorithm performs a tree search for almost all bits and hence $P_b \approx P_{ML}$. This agrees with (7) since $P_\delta \to 0$ as $V_{th}$ gets larger. When $V_{th}$ is very small so that $P_\delta \gg P_{ML}$, (6) becomes less applicable since tree search is almost absent and $P_b \approx P_\delta$ due to MMSE. One is typically not interested in this region. Numerical results below demonstrate that (7) provides accurate results (FIG. 1).

Equation (7) provides one a rule to select $V_{th}$. Suppose, one wants $P_b$ of WCE to be within a fraction $\epsilon$ of $P_{ML}$. From (7) one gets $$(1-\epsilon)P_{ML} = P_\delta + (1-P_\delta)P_{ML}, \quad (8)$$

and hence $$P_\delta = \frac{\epsilon P_{ML}}{1 - P_{ML}} \quad (9)$$

resulting in $$V_{th} = -|\mu_0| + \sigma_0 Q^{-1}\left(\frac{\epsilon P_{ML}}{1 - P_{ML}}\right) \quad (10)$$

No existing equalizer can provide such a strategy to obtain $P_b$ within a desired fraction of $P_{ML}$. Note that for $P_{ML} \ll 1$, one can approximately replace $1-P_{ML}$ by 1.

In computing $V_{th}$ using (10), three parameters, $\mu_0$, $\sigma_0$ and $P_{ML}$ are needed. The parameters $\mu_0$ and $\sigma_0$ are obtained from the MMSE filter coefficients. K. R. Narayanan, supra. For example, $\mu_i$, $i=0,1$, can be obtained as $\text{Re}\{g^H p/x_{l-L+1}^*\}$, depending on the corresponding data bit being a 0 or a 1 respectively. For BPSK, $\sigma_0^2 = \mu_0 - \mu_0^2$ and for QPSK $\sigma_0^2 = \mu_0/\sqrt{2} - \mu_0^2$. Finding $P_{ML}$ is not straightforward. One can use $P_{ML}$ values obtained through numerical simulations for studying the behavior of WCE. However, in a practical use of the algorithm, one has to find $P_{ML}$ on-line. This can be taken care of by using tight upper or lower bounds. G. D. Forney. Jr., "Lower bounds on error probability in the presence of large intersymbol interference," *IEEE Trans. Commun.*, vol. 20, pp. 76-77, February 1972; S. Verdu, "Maximum likelihood sequence detection for intersymbol interference channels: a new upper bound on error probability," *IEEE Trans. Inform. Theory*, vol. 33, pp. 62-68, January 1987; and W. H. Sheen and G. L. Stuber, "MLSE equalization and decoding for multipath-fading channels," *IEEE Trans. Commun.*, vol. 39, pp. 1455-1464, October 1991. In the present invention, it is preferred to use a matched filter (MF) bound given by $$P_{MF} = Q(\sqrt{2\gamma}) \quad (11)$$

for fixed ISI channel, where $\gamma$ is the average received SNR. J. E. Mazo, "Exact matched filter bound for two-beam Rayleigh fading," *IEEE Trans. Commun.*, vol. 39, pp. 1027-1030, July 1991. In practice, a receiver may or may not achieve the MF bound. However, one does not need to know the exact value of $P_{ML}$ if $P_{ML}$ is used.

Suppose one changes the design requirement slightly so that one now wants $P_b$ of WCE to be worse than $P_{ML}$ at most by a fraction $\epsilon$ of $P_{MF}$ instead of $P_{ML}$. From (8), one gets $$P_{ML} + \epsilon P_{MF} = P_\delta + (1-P_\delta)P_{ML}, \quad (12)$$

which gives $$P_\delta = \frac{\epsilon P_{MF}}{1 - P_{ML}} \quad (13)$$

Since in the region of interest, $P_{ML} \ll 1$, we get $P_\delta \approx \epsilon P_{MF}/(1-P_{MF}) \approx \epsilon P_{MF}$. Hence, one can choose $V_{th}$ as $$V_{th} \approx -|\mu_0| + \sigma_0 Q^{-1}\left(\frac{\epsilon P_{MF}}{1-P_{MF}}\right) \approx -|\mu_0| + \sigma_0 Q^{-1}(\epsilon P_{MF}) \quad (14)$$

There is a penalty on the computational side due to this simplification and will be discussed in the complexity analysis later.

When the ISI changes from packet to packet, the error probability $P_b$ is to be averaged over random channel realizations to get an average error probability $\overline{P}_b$. For large $V_{th}$ and large window size, the ML performance $\overline{P}_{ML}$ is obtained, where $\overline{P}_{ML}$ now represents average over the fading channels. Hence the average error probability $\overline{P}_b$ is obtained from (7) asymptotically as $$\overline{P}_b \square \overline{P}_\delta + (1-\overline{P}_\delta)\overline{P}_{ML} \quad (15)$$

where $$\overline{P}_\delta = E\left[Q\left(\frac{V_{th}+|\mu_0|}{\sigma_0}\right)\right] \quad (16)$$

Figure 4:
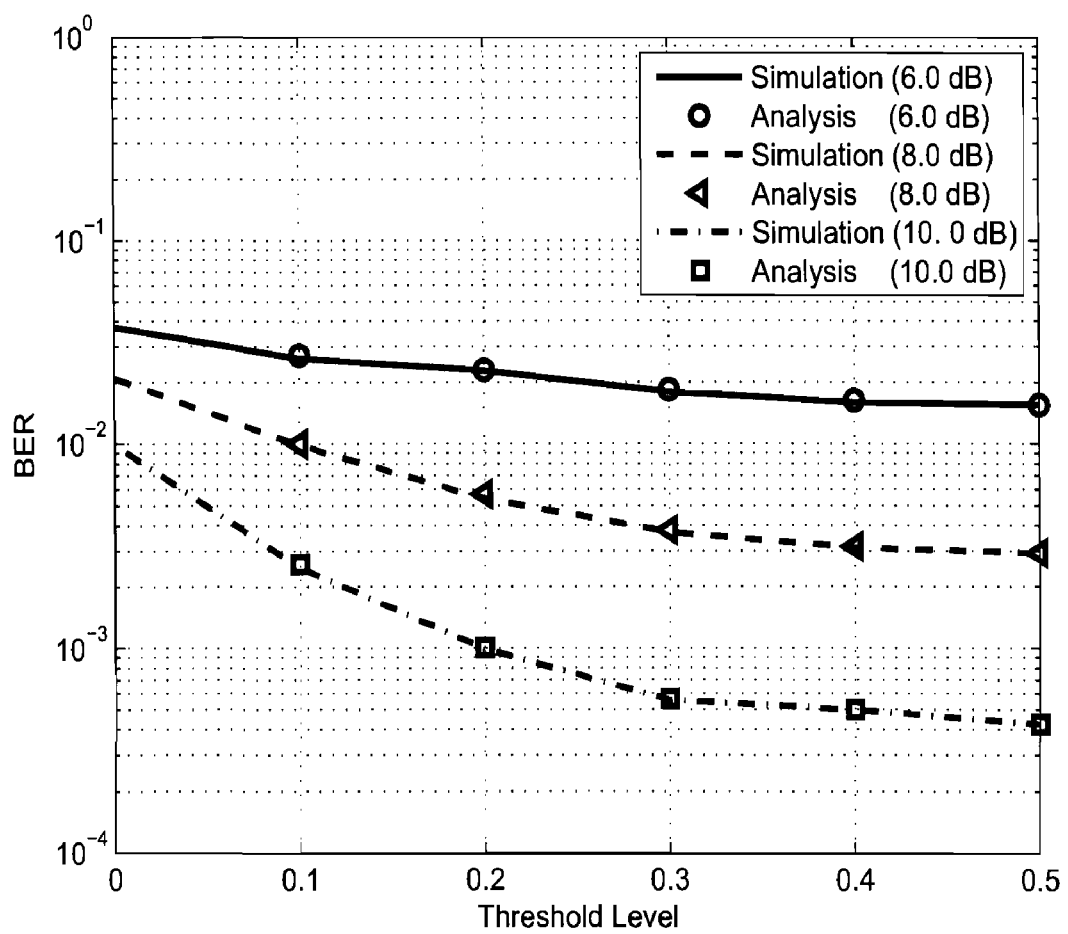
FIG. 4 is a graph showing effects of threshold $V_{th}$ on BER for channel C2 with QPSK modulation.

FIG. 4 shows that (15) provides very good results where $\overline{P}_{ML}$ is obtained through simulations. Instead of $\overline{P}_{ML}$, one can use the MF bound $\overline{P}_{MF}$ for the fading channels and obtain an approximate lower bound as $$\overline{P}_b \geq \overline{P}_\delta + (1-\overline{P}_{67})\overline{P}_{MF} \quad (17)$$

where $\overline{P}_{MF}$ is the matched filter bound which is obtained by averaging (11) over all possible channel realizations. For BPSK and QPSK, closed form expressions for $\overline{P}_{MF}$ is derived in F. Ling, "Matched filter-bound for time-discrete multipath Rayleigh fading channels," *IEEE Trans. Commun.*, vol. 43, pp. 710-713, March 1995. This can also be obtained from maximal ratio combiner (MRC) for independent fading paths, M. K. Simon and M. S. Alouini, *Digital Communication over fading channels,* John Wiley & Sons, Inc., 2000, by calculating the symbol error probability given by $$P_{s,MRC} = \frac{1}{\pi}\int_0^{(M-1)\pi/M}\prod_{l=0}^{L-1}\left(1+\frac{\gamma_l \sin^2\left(\frac{\pi}{M}\right)}{\sin^2\theta}\right)^{-1}d\theta \quad (18)$$

where $\gamma_l = \alpha_l m E_b/N_0$, $E_b$ is the average bit energy, $N_0$ is noise power spectral density and $\alpha_l$ is the average power for the l-th channel coefficient. The bit error probability for MRC can then obtained by $P_{b,MRC} = 1-(1-P_{s,MRC})^{1/m}$. For Gray codes, $P_{b,MRC} \approx P_{s,MRC}/m$.

There are K/m complex multiplications per bit and (K−1)/m additions per bit in implementing the MMSE stage. The complexity of the Chase stage depends on the list size. Assuming independent bit errors, the average list size $\overline{S}$ in a window can be approximated as $$\sum_{k=1}^{m}\sum_{i=0}^{m(W-1)}\binom{m}{k}\binom{m(W-1)}{i}2^{k+i}P_\Gamma^{k+i}(1-P_\Gamma)^{mW-k-i} \quad (19)$$

This can be simplified as $$\overline{S} = (1+P_\Gamma)^{mW}\left(1-\left(\frac{1-P_\Gamma}{1+P_\Gamma}\right)^m\right), \quad (20)$$

where $P_\Gamma$ is the probability that a bit belongs to $\Gamma$. It is given by $$P_\Gamma = Q((|\mu_0|-V_{th})/\sigma_0)-P_\delta \quad (21)$$

which becomes $$P_\Gamma = Q\left(\frac{2|\mu_0|}{\sigma_0} - Q^{-1}\left(\frac{\epsilon P_{ML}}{1-P_{ML}}\right)\right) - \frac{\epsilon P_{ML}}{1-P_{ML}} \quad (22)$$

$$= Q\left(\frac{2|\mu_0|}{\sigma_0} - Q^{-1}\left(\frac{\epsilon \eta P_{MF}}{1-\eta P_{MF}}\right)\right) - \frac{\epsilon \eta P_{MF}}{1-\eta P_{MF}} \quad (23)$$

where $P_{ML} = \eta P_{MF}$, $\eta \geq 1$, and we call $\eta$ the MLSD-MF BER ratio. Using (20) and (22) one can find out the average list size for any given deviation $\epsilon$ from ML BER.

When $P_{MF}$ is used instead of $P_{ML}$ to calculate $V_{th}$ as in (14), the average list size becomes $$\overline{S}_{MF} = (1+P_{\Gamma,MF})^{mW}\left(1-\left(\frac{1-P_{\Gamma,MF}}{1+P_{\Gamma,MF}}\right)^m\right), \quad (24)$$

where $$P_{\Gamma,MF} = Q\left(\frac{2|\mu_0|}{\sigma_0} - Q^{-1}\left(\frac{\epsilon P_{MF}}{1-P_{MF}}\right)\right) - \frac{\epsilon P_{MF}}{1-P_{MF}} \quad (25)$$

The fractional increase in average list size due to this simplification is the MF use penalty, $(\overline{S}_{MF}-\overline{S})/\overline{S}$, given by $$\left(\frac{1+P_{\Gamma,MF}}{1+P_\Gamma}\right)^{mW}\left(1-\left(\frac{1-P_{\Gamma,MF}}{1+P_{MF}}\right)^m\right)\left(1-\left(\frac{1-P_\Gamma}{1+P_\Gamma}\right)^m\right)^{-1} - 1 \quad (26)$$

Figure 2:
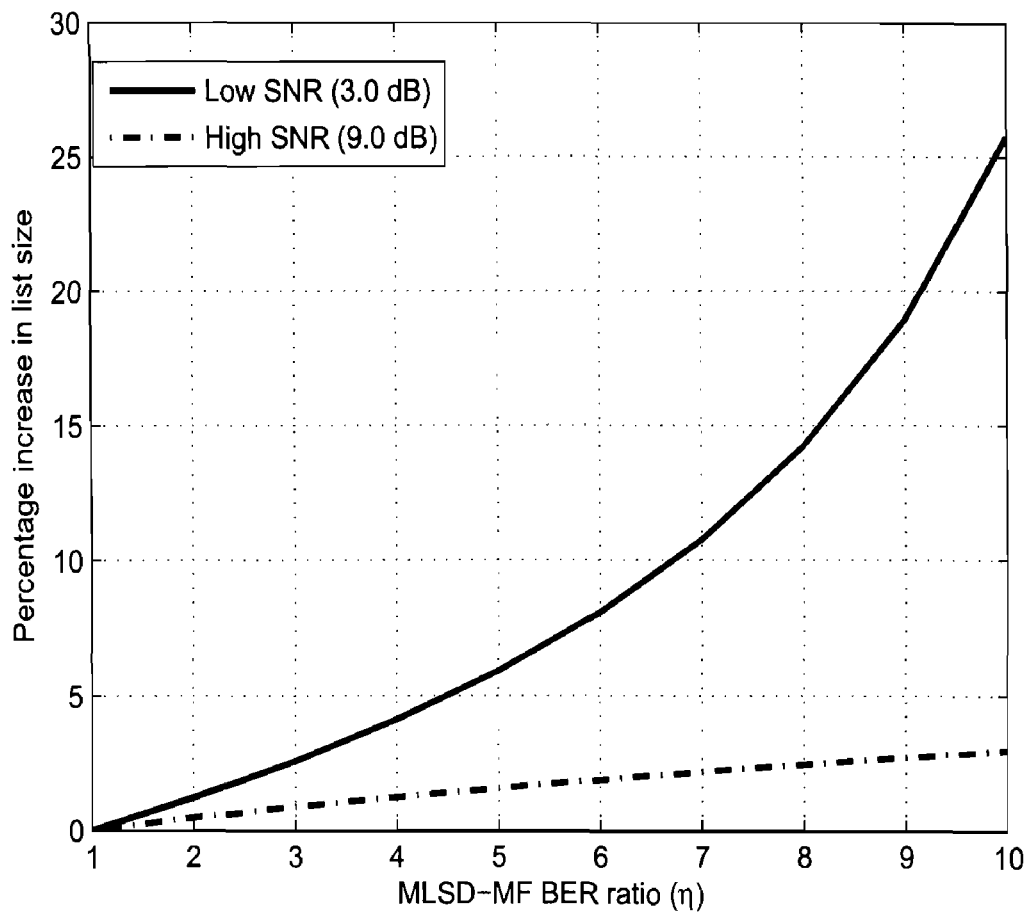
FIG. 2 is a graph showing effects of MLSD-MF BER ratio $\eta$ on percentage increase in list size.

This penalty (in percentage) is shown in FIG. 2 for a 7-tap fading channel with equal power coefficients (channel C2 described in section VI) using QPSK modulation and $\epsilon=0.05$. Consider $P_{MF}=0.015$ and $2.1\times 10^{-6}$, representing low and high SNR cases respectively. The $P_{ML}$ values are hypothetically calculated using $P_{ML}=\eta P_{MF}$ for various values of $\eta$ to see how a mismatch between $P_{ML}$ and $P_{MF}$ affects complexity in terms of $\overline{S}$. It is clear from the figure that at high SNR, even $\eta=10$ increases complexity by less than 4%. At low SNR, complexity can increase as high as 25% for $\eta=10$, mostly due to ignoring the $1-P_{ML}$ factor in (13). Also note that for this hypothetical case, $P_{ML}=0.15$, which is too pessimistic for practical applications. For fading channels, the average list size $\overline{S}$ should be computed by averaging over random channel realizations.

Figure 7:
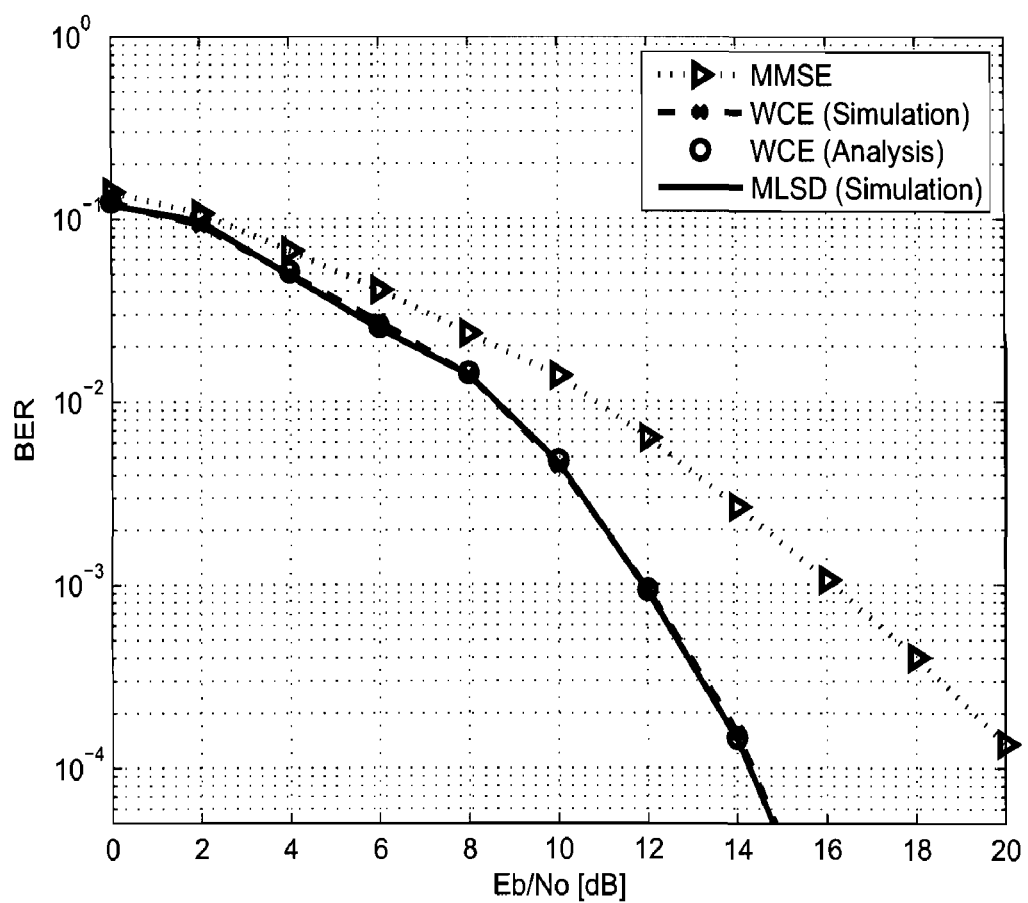
FIG. 7 is a graph showing BER performance of WCE for channel C3 with QPSK modulation.

Assuming all $x_k h_i$ are pre-computed and stored, the average number of complex multiplications, additions and min operations are $\overline{S}(W+L-1)/m$, $\overline{S}(W(L+1)+L^2-2)/m$ and $1/m$ respectively. In contrast, the MLSD requires $M^L/m$ multiplications, $LM^L/m$ additions and $M^{L-1}/m$ min operations. As an example, consider QPSK modulation with $W=L=7$, and $SNR=12$ dB. Let $\epsilon$ be 0.05 so that one gets a BER of $1.10\times 10^{-3}$ instead of $P_{ML}=1.05\times 10^{-3}$ of MLSD (FIG. 7). From simulations, one obtains by averaging over random channels, $\overline{S}=45$ and thus the average number of multiplications is about 308 per bit for WCE. In contrast, the number of multiplications for MLSD is about 8192. The complexity reduction benefits will be more for higher values of L. For example, for L=11, we get from simulations, $\overline{S}$=928 and the number of multiplications becomes about $9.8\times10^3$, while that of MLSD is about $2.1\times10^6$.

Both BPSK and QPSK modulations are considered. For BPSK, the fixed ISI Proakis A[2] channel with length L=11 is taken. The impulse response of this channel is given by [0.04−0.05 0.07−0.21 −0.5 0.72 0.36 0 0.21.0.03 0.07]. Call this the C1 channel. For QPSK modulation, two block fading channels C2 and C3 with ISI length L=7 are considered. The channel C2 is a complex Gaussian channel with zero mean and identical power coefficients. The third channel C3 is also complex Gaussian with an exponential decay power profile. Data packets have $N_p$=256 symbols, K=31 and W=L are chosen for WCE. The MLSD simulation results are obtained by using VA over the whole data packet.

Figure 3:
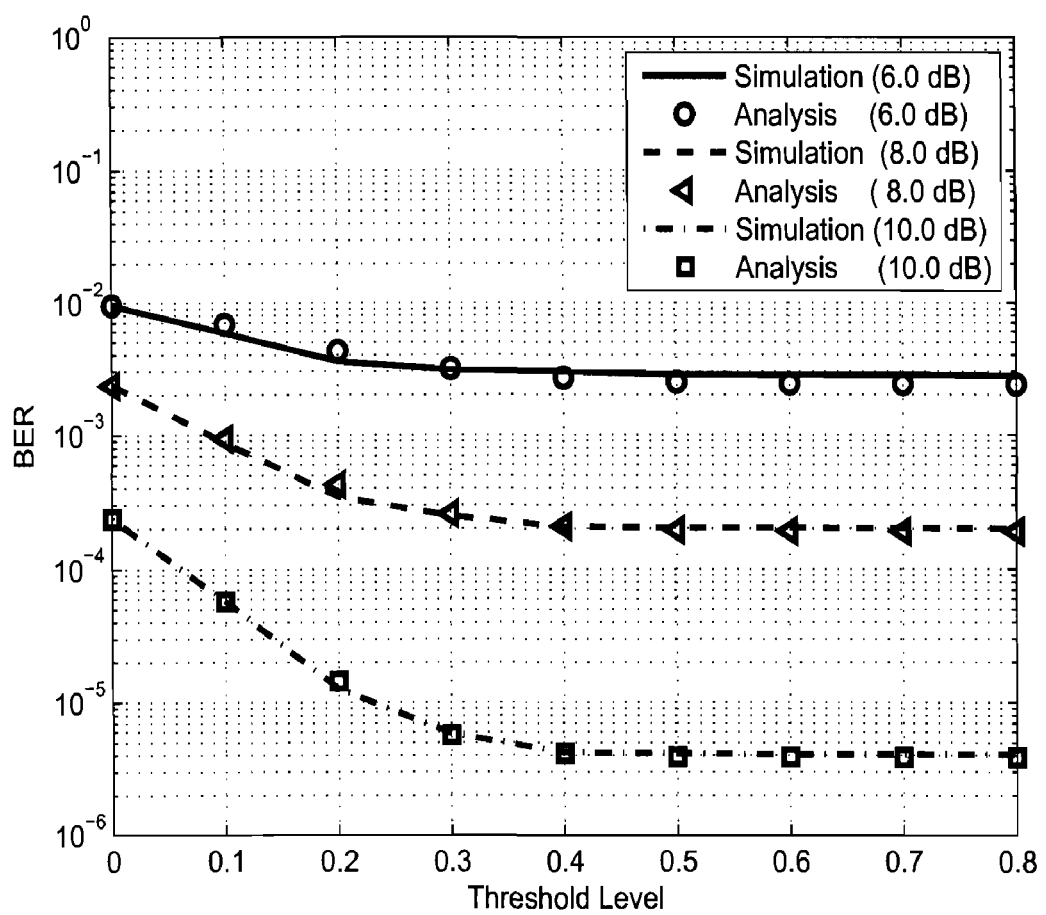
FIG. 3 is a graph showing effects of threshold $V_{th}$ on BER for channel C1 with BPSK modulation.

FIG. 3 shows the effect of threshold level on the BER performance for channel C1 with BPSK. Note that when $V_{th}$=0, the BER performance of WCE is same as the MMSE equalizer while $P_b \approx P_{ML}$ for large $V_{th}$. The figure shows that the analysis (7) agrees well with simulation. A similar study is shown for QPSK modulation in FIG. 4. Also note that the analysis results in FIG. 4 are actually semi-analytical in nature since $\overline{P}_\delta$ and $\overline{P}_{ML}$ values used in (15) are obtained through simulations.

Figure 5:
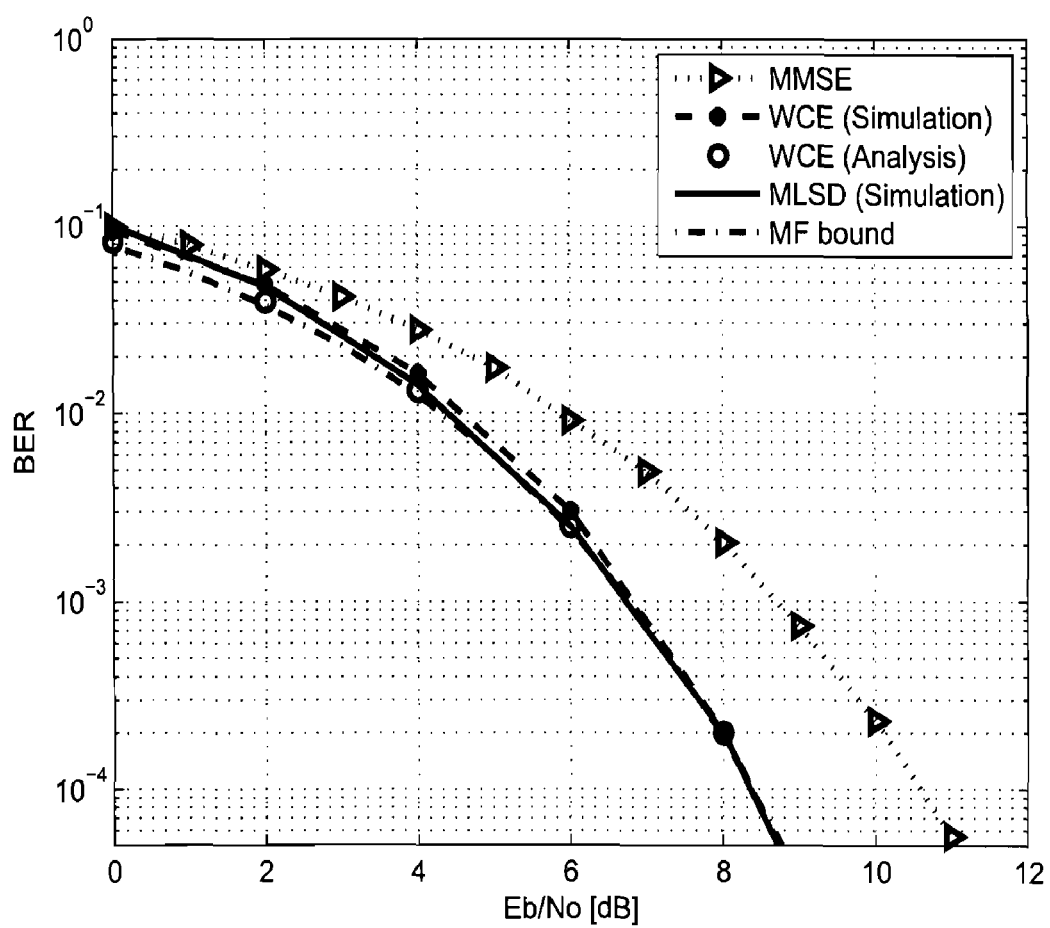
FIG. 5 is a graph showing BER performance of WCE for channel C1 with BPSK modulation.
Figure 6:
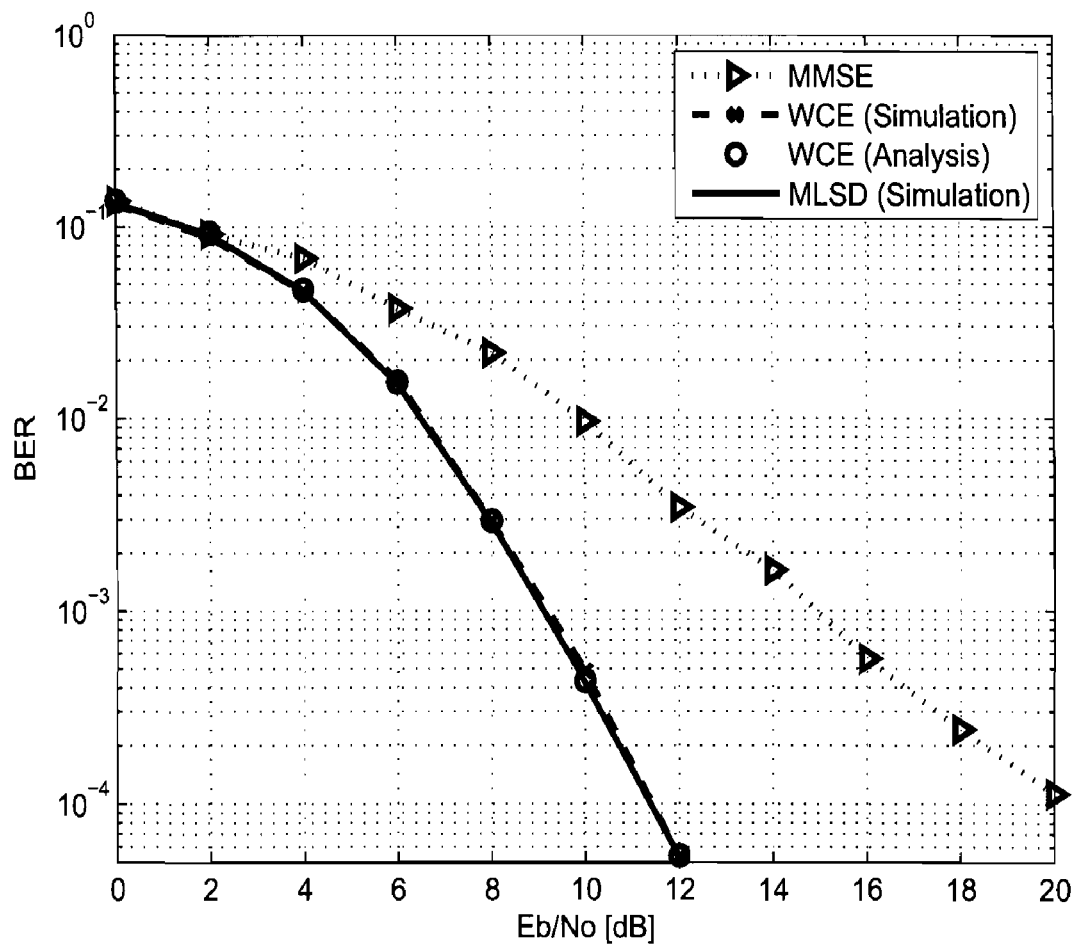
FIG. 6 is a graph showing BER performance of WCE for channel C2 with QPSK modulation.

FIGS. 5, 6 and 7 show BER performance for channels C1 (BPSK), C2 (QPSK) and C3 (QPSK) respectively. One obtains close to MLSD performance using $V_{th}$ from (10) and (14), for fixed and block fading channels respectively, with $\epsilon$=0.05.

Figure 8:
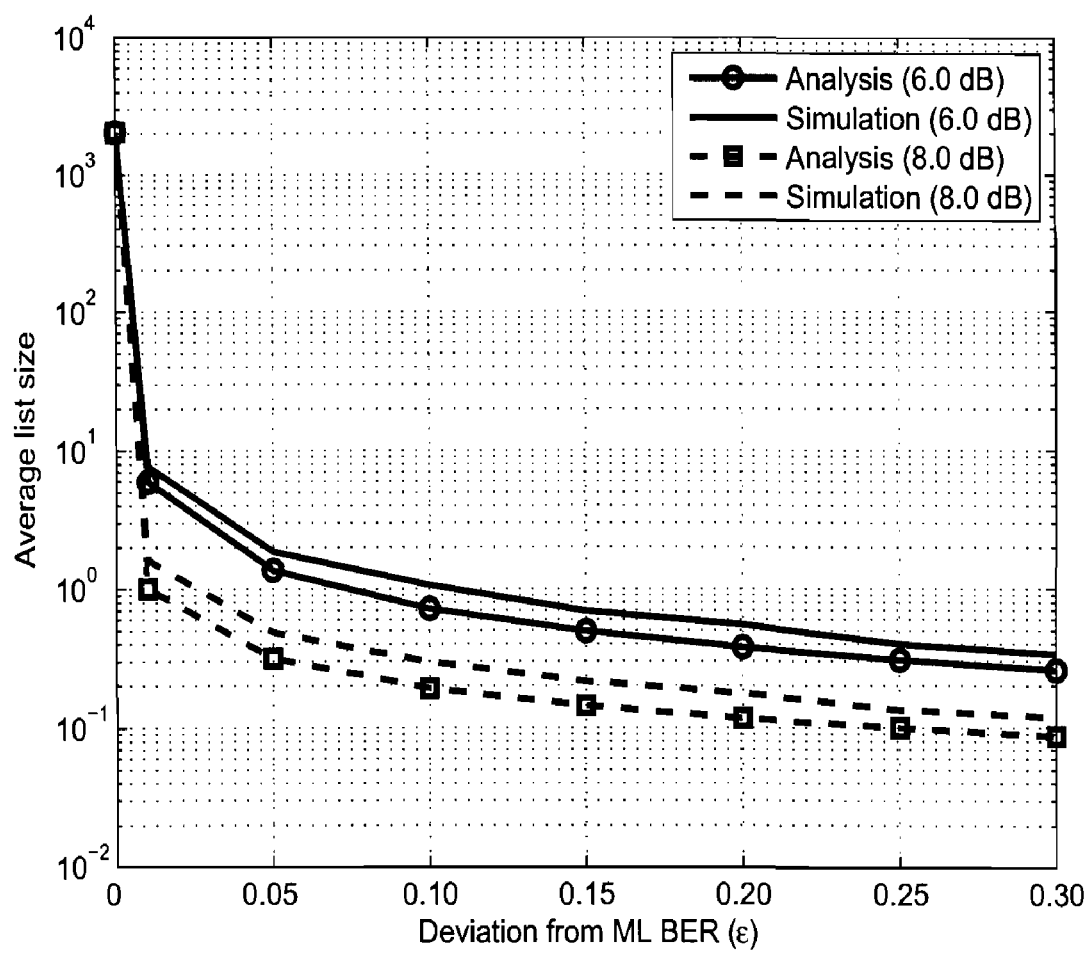
FIG. 8 is a graph showing Effects of $\epsilon$ on the average list size per detected symbol for channel C1.

FIG. 8 shows the effects of $\epsilon$ on the average list size per detected symbol for channel $C_1$ (BPSK). We observe that for exact ML performance ($\epsilon$=0) the list size is $\overline{S}$=2048 for 8.0 dB giving $P_{ML}$=1.91×10$^{-4}$. However, if one relaxes the requirement by 1 percent and target for a BER of 1.93×10$^{-4}$ then $\overline{S}$□1.6. This can hugely benefit system design for low complexity yet near-optimal detection in long ISI channels.

Figure 9:
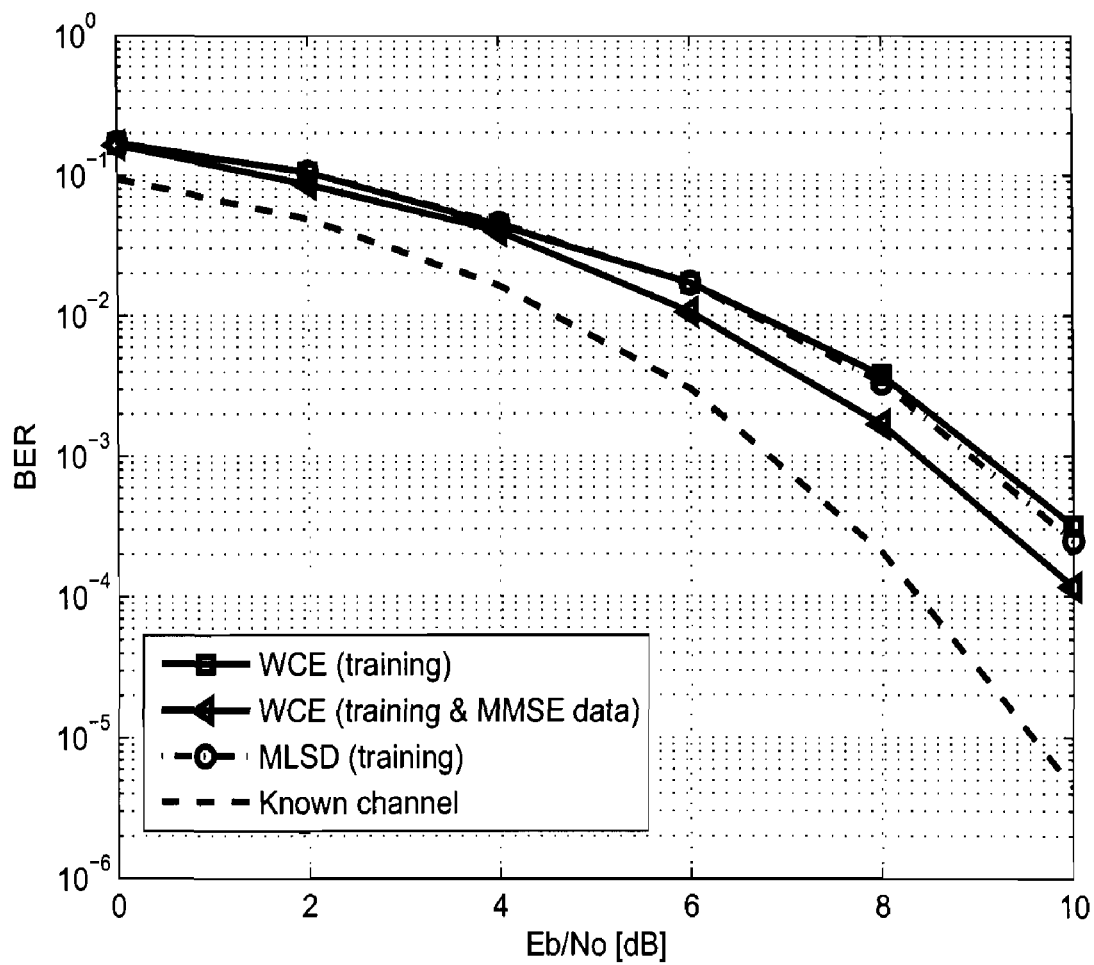
FIG. 9 is a graph showing BER performance of WCE for channel C1 (BPSK) with channel estimation.

FIG. 9 shows the BER performance for channel C1 with BPSK modulation. The channel is estimated using training symbols. Data packets in this case consist of 200 symbols of data and 56 symbols of training. The channel coefficients are estimated using the least squares estimator, S. M. Kay, *Fundamentals of Statistical Signal Processing Estimation Theory*, New Jersey: Prentice Hall Signal Processing Series, 1993, and then the noise variance is estimated using the already estimated channel coefficients. We show two sets of results for the unknown channel. In the first case, only the training symbols are used for channel estimation and this estimate is used for MMSE equalizer coefficient calculation and in WCE detection. In the second case, the training symbols are used for MMSE equalizer coefficient calculations, but once the MMSE equalized detected data are available, the whole detected data packet is used for estimating the channel coefficients again. This new set of estimated channel coefficients is used for WCE computations. The second approach provides BER improvement at the cost of additional computations and delay. Also shown is the effect of channel estimation on MLSD, which uses only the training data for channel estimation. This performance is similar to WCE that uses only the training data for channel estimation. The WCE can provide improved performance using MMSE detected data along with training data, since the MMSE equalizer is a part of WCE anyway. This is an additional benefit of WCE.

Figure 10:
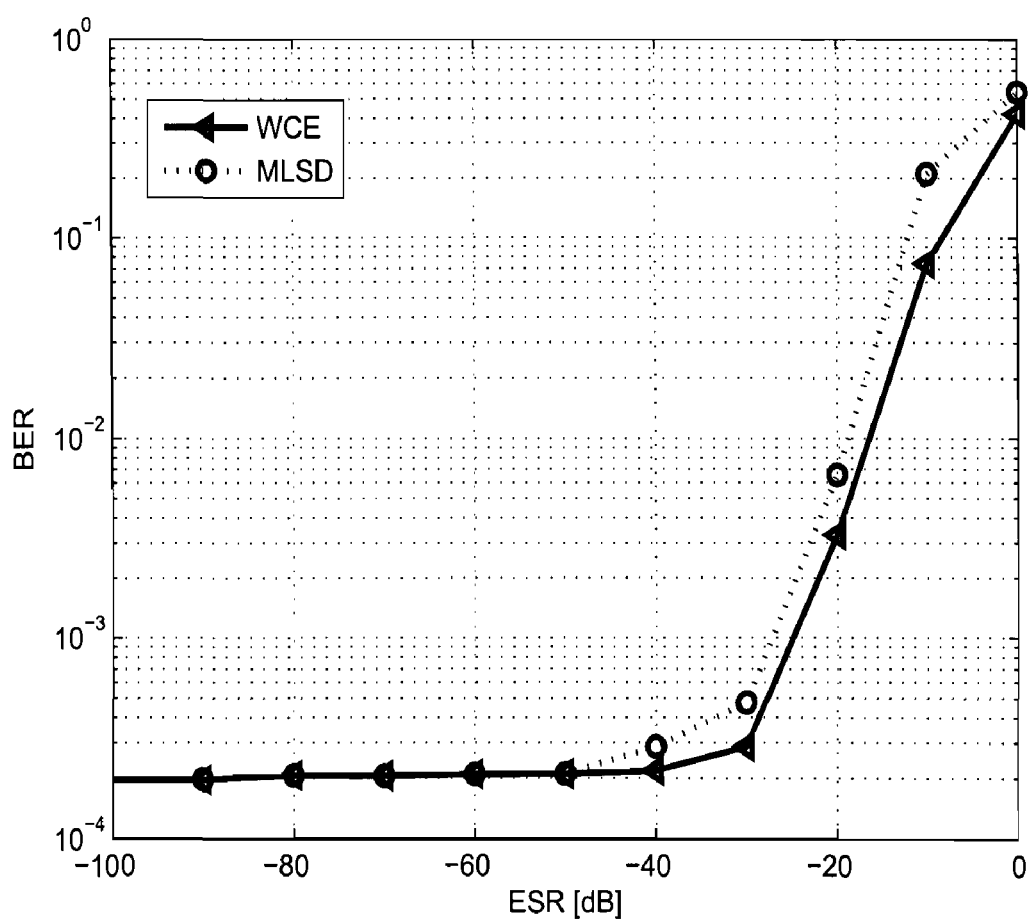
FIG. 10 is a graph showing effects of channel estimation error on the BER performance of WCE and MLSD at $E_b/N_0=8.0$ dB.

FIG. 10 shows the effects of channel estimation error on WCE. The estimation error is modeled as a Gaussian random variable, i.e., $\hat{h}_i = h_i + w_i$ for i=0, ..., L−1, where $w_i$ is a Gaussian random variable with zero mean and variance equal to $\sigma_w^2$. The x-axis is the estimation error-to-signal ratio (ESR) defined as $\sigma_w^2/E_b$. D. Gu and C. Leung, "Performance analysis of transmit diversity scheme with imperfect channel estimation," *Electron. Lett.*, vol. 39, pp. 402-403, February 2003. The BER performance is plotted for $E_b/N_0$ equal to 8.0 dB for channel C1 with BPSK modulation, where the true ML BER is 1.91×10$^{-4}$. The initial erroneous channel is used to estimate the MMSE filter coefficients. The MMSE equalizer is next used to detect data over the whole packet. The whole detected data is then used to re-estimate the channel and this new channel estimate is used for both WCE and MLSD. The effect of estimation error is negligible at an ESR of −50 dB. However, at higher ESR, the performance degrades significantly. It can be seen that the performance of MLSD with estimation error is similar to that of WCE at low ESR, while degrades at high ESR. For this example, WCE is more robust to channel estimation errors.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference.

What is claimed is:

1. A method of data detection in channels suffering from intersymbol interference, the method comprising the steps of, bit-wise for each individual binary digit of data received:
   receiving a signal representative of a binary digit or multiple digits of data;
   as a first stage, computing a reliability score for that binary digit or reliability scores for multiple digits of data using a linear minimum mean squared error filter;
   as a second stage, causing binary digit decision or decisions via windowed Chase equalization, wherein a part of a whole message waveform is covered at a time; and
   sliding the filter over time or sliding the Chase window over time, or changing the length of the filter, or changing the Chase window size, in order to cause multiple binary digit decisions, using binary digit decisions from previous positions of the filter.

2. The method of claim 1 wherein the causing step is informed by both first stage and second stage determinations.

3. The method of claim 1 wherein the first stage does not have to complete before initiation of the second stage.

4. The method of claim 1 wherein the computing step comprises employing a decision feedback equalizer.

5. An apparatus for data detection in channels suffering from intersymbol interference, said apparatus comprising:
   a unit receiving a signal representative of a binary digit or multiple digits of data;
   as a first stage, hardware computing a reliability score for that binary digit or reliability scores for those binary digits of data using a linear minimum mean squared error filter;
   as a second stage, hardware causing binary digit decision or decisions and concomitant signal output via windowed Chase equalization, wherein a part of a whole message waveform is covered at a time; and
   hardware sliding the filter over time or sliding the Chase window over time, or changing the length of the filter, or changing the Chase window size, in order to cause multiple binary digit decisions, using binary digit decisions from previous positions of the filter.

6. The apparatus of claim 5 wherein said hardware is informed by both first stage and second stage determinations.

7. The apparatus of claim 5 wherein said first stage does not have to complete before initiation of said second stage.

8. The apparatus of claim 5 wherein said first stage hardware employs a decision feedback equalizer.

9. A computer-readable medium comprising computer software for data detection in channels suffering from intersymbol interference, said computer software comprising machine-readable code embodied on a physical medium and comprising:

code receiving a signal representative of a binary digit or multiple digits of data;

as a first stage, code computing a reliability score for that binary digit or multiple binary digits of data using a minimum mean squared error filter;

as a second stage, code causing binary digit decision or decisions via windowed Chase equalization, wherein a part of a whole message waveform is covered at a time; and code sliding the filter over time or sliding the Chase window over time, or changing the length of the filter, or changing the Chase window size, in order to cause multiple binary digit decisions, using binary digit decisions from previous positions of the filter.

10. The computer-readable medium of claim 9 wherein said causing code is informed by both first stage and second stage determinations.

11. The computer-readable medium of claim 9 wherein in said computing code said first stage does not have to complete before initiation of said second stage.

12. The computer-readable medium of claim 9 wherein said computing code employs a decision feedback equalizer.

\* \* \* \* \*